(12) United States Patent
Gower (10) Patent No.: US 6,176,050 B1
(45) Date of Patent: Jan. 23, 2001

(54) FLEXIBLE PROTECTIVE WIND ABATEMENT SYSTEM

(76) Inventor: Ted Gower, 624 Riverside Rd., N. Palm Beach, FL (US) 33408

( * ) Notice: Under 35 U.S.C. 154(b), the term of this patent shall be extended for 0 days.

(21) Appl. No.: 09/270,249

(22) Filed: Mar. 15, 1999

Related U.S. Application Data (63) Continuation-in-part of application No. 08/861,209, filed on May 21, 1997, now abandoned.

(51) Int. Cl.[7] .................................................. E04B 1/00
(52) U.S. Cl. .............................. 52/222; 135/90; 135/115; 135/119; 52/3
(58) Field of Search ................................ 52/3.5, 23, 222, 52/DIG. 11; 135/88.81, 88.14, 90, 913, 115, 119, 903; 160/120

(56) References Cited

U.S. PATENT DOCUMENTS

| | | | |
|---|---|---|---|
| 3,805,816 | * | 4/1974 | Nolte . |
| 3,862,876 | * | 1/1975 | Graves . |
| 3,949,527 | * | 4/1976 | Double . |
| 4,259,819 | * | 4/1981 | Wemyss ................................. 52/222 |
| 4,283,888 | * | 8/1981 | Cros . |
| 4,290,243 | * | 9/1981 | Mellin ..................................... 52/63 |
| 4,487,212 | * | 12/1984 | Moore .................................... 135/90 |
| 4,590,714 | * | 5/1986 | Walker . |
| 4,848,386 | * | 7/1989 | Cooper ................................... 135/90 |
| 4,858,395 | * | 8/1989 | McQuirk . |
| 5,174,073 | * | 12/1992 | Sabo ........................................ 52/3 |
| 5,319,896 | * | 6/1994 | Winger .................................... 52/23 |
| 5,347,768 | * | 9/1994 | Pineda . |
| 5,522,184 | * | 6/1996 | Oviedo-Reyes . |
| 5,531,239 | * | 7/1996 | Hannah .............................. 52/166 X |
| 5,579,794 | * | 12/1996 | Sporta ................................... 52/4 X |
| 5,687,512 | * | 11/1997 | Spoozak et al. ......................... 52/23 |

* cited by examiner

Primary Examiner—Beth A. Stephan
(74) Attorney, Agent, or Firm—McHale & Slavin (57) ABSTRACT

A device for protection of property against high winds constructed from a flexible screen of predetermined strength and stretch characteristics, and in the form of a curtain, utilized to protect the side of a structure including its windows and doors from the strong winds and debris impacts occurring during a hurricane. The device is anchored in a manner to space it out from the area being protected according to formula provided, and can safely dissipate substantial impacting energy. The preferred embodiment attaches to an overhanging eave and the ground below protecting in addition to the windows and doors, planters, outdoor furniture, decorative shutters, downspouts, and such as are enclosed behind the barrier. Several methods of storage and deployment of the device are described including rolling, sliding, and converting to awning. The barrier has the added feature of acting as a tie down in certain applications.

8 Claims, 10 Drawing Sheets

FLEXIBLE PROTECTIVE WIND ABATEMENT SYSTEM

This application is a continuation-in-part application of a U.S. patent application filed on May 21, 1997. The parent application has the Ser. No. 08/861,209, now abandoned and the contents thereof are hereby incorporated by reference.

FIELD OF THE INVENTION

This invention relates to the protection of property against high winds and, in particular, to a flexible protective barrier device for securing property against the force of winds and from impact of foreign objects carried by the wind as occasioned by hurricanes, tornadoes and the like.

BACKGROUND OF THE INVENTION

As is known by one skilled in the art of protecting buildings and the like from damage caused by missile-like objects that are occasioned by the heavy winds of hurricanes or tornadoes, there are commercially available variations of hurricane protective devices, often called shutters, that fasten immediately over the frangible area to be protected. These devices are typically expensive to purchase, cumbersome, made from stiff, heavy material such as steel and aircraft quality aluminum alloy or occasionally plastic with reinforcing. Many need to be manually connected and then removed and stored at each threat of inclement weather. Many require unsightly and difficult-to-mount reinforcing bars at multiple locations. Further, these known shutters are usually opaque, preventing light from entering a shuttered area and preventing an inhabitant from seeing out. Likewise, it is desirable that police be able to see into buildings to check for inhabitants and to prevent looting which can be a problem in such circumstances. Missiles, even small not potentially damaging missiles, striking these heretofore known shutters create a loud, often frightening bang that is disturbing to inhabitants being protected.

Standardized testing requiring these protective devices to meet certain standards of strength and integrity has been introduced for various utilizations and locales. In order to qualify for use where testing requirements apply, the strength and integrity characteristics of these protective devices must be predictable and must be sufficient to meet mandated standards. Additionally, it is beneficial to qualify for these standards even in situations in which standards do not apply. As a result of these standards, many undesirable aspects of the previously-known shutters have been acerbated. They have become more cumbersome, more bulky, heavier, more expensive, more difficult to store, and remain generally opaque and noisy when impacted. To incorporate sufficient strength to meet said requirements, weight and bulk become a problem over six feet in span. The useable span (usually height) of the heretofore known shutters that meet said standards may be limited to eight feet or less. This makes protecting large windows, for example, or groupings of windows, with the heretofore known devices cumbersome, expensive and impractical. Devices that are intended to be deployed in a roll down manner either manually, automatically, or simply by motor drive, have been difficult to strengthen sufficiently to pass the test requirements and require unsightly reinforcing bars every few feet.

Prior to the introduction of said standards, an ordinary consumer had very little useful knowledge of the strength and integrity of said shutters. It is believed shutters of the pre-standard era were very weak such that all would fail the present standardized testing. It should be understood that the standards are not intended to provide a shutter that will protect in all situations. As the hurricane conditions can be very violent and destructive, the standards are not intended to require strength and integrity sufficient to protect in all circumstances. The standards simply provide a benchmark as to strength and integrity. Said strength and integrity of the shutters can now be measured.

There are many patents that teach the utilization of knitted or woven fabric such as netting, tarpaulins, drop cloths, blankets, sheets wrapping and the like for anchoring down recreational vehicles, nurseries, loose soil and the like. But none of these are intended for, nor are capable of withstanding the forces of the missile-like objects that are carried by the wind in hurricanes.

Some protection devices have internal stiffness and rigidity that resists deflection, or bending. In rigid protection devices, it is stiffness that stops the missile short of the frangible surface being protected.

Other protection devices use fabric or netting material to cover a unit to be protected. Typically, the device completely covers the unit, and edges of the fabric are fastened to the ground. Examples of fabric-employing devices are shown in the following patents: U.S. Pat. Nos. 3,862,876 issued to Graves, 4,283,888 and 4,397,122 issued to Cros, 4,858,395 issued to McQuirk, 3,949,527 issued to Double et al., 3,805,816 issued to Nolte, 5,522,184 issued to Oviedo-Reyes, 4,590,714 issued to Walker and 5,347,768 issued to Pineda. The 5,522,184 patent for example, provides a netting that fits flush over the roof of a building and uses a complicated anchoring system to tie down the netting.

Typical of known flexible, fabric-employing protection devices is the characteristic of substantial wind-permeability. For example, U.S. Pat. No. 5,579,794, issued to Sporta, discloses a wind-permeable perforate sheet that extends downwardly and outwardly from the top of the object to be protected at an acute angle so as to surround a substantial portion of each of the sides with an inclined wind-permeable planar surface. The Sporta device, for example, discloses protective barriers that are from 50% to 90% open. With this type of device, any reduction in wind reaching the covered structure will be slight. The Sporta device may be effective in reducing damage otherwise caused by the impact of some debris. However, the substantially-wind permeable nature of the Sporta device makes this type of protective barrier a ineffective at reducing damage caused by the wind, itself.

Thus, what is lacking in the art is a flexible protective barrier constructed from a mesh material that can be easily stored and deployed for protecting the frangible portion of a structure not only from objects carried by the wind, but also from the force of the wind itself.

SUMMARY OF THE INVENTION

This invention contemplates the use of a flexible barrier, preferably a reasonably transparent, woven synthetic textile that is able to satisfy stringent testing requirements. Certain types of flexible material capable of withstanding high impact loads without bursting, can be disposed in front of the building or other structures intended to be protected, and anchored on opposing edges, to form a curtain sufficiently spaced from the frangible area to contain the impact of foreign objects hurled by the high winds. When used with a building, for example, the top edge of the fabric may be anchored to the eave of the roof and the bottom of the fabric may be attached to anchors imbedded in the ground or cement, so as to present a curtain adequately spaced out from and in front of the structure of the building to be protected. Not only does this afford frontal protection but, properly located and attached, it also serves to tie down the roof and protect it from blowing off. The winds that would ordinarily blow off the roof exert a force on the fabric which, in turn, exerts a downward force on the roof to act against the lifting forces tending to lift the roof. Knitted or extruded material can be used if the material itself meets the criteria described later herein.

The device provides a barrier that is substantially impermeable to wind. Although air travels through the barrier, the barrier is approximately 95% closed, and the velocity of wind passing through the device is greatly reduced. For example, the velocity of a 100 mph wind is reduced by approximately 97% by passing through the wind abatement system of the present invention. The wind abatement system of the present invention substantially reduces the force of wind passing through the device and also provides a barrier against wind-borne missiles having diameters of approximately 3/16 inch in diameter or larger.

The ability to provide protection from wind forces and solid debris in a flexible device represents a step forward in this field. In fact, the Miami-Dade County, Fla. region has, after seeing the present invention, begun creating a new category of protective devices. The Miami-Dade County region is recognized as a leader in the field of hurricane-protection-related standards, and creation of this new category will likely result in modifications of the existing regional building code, including new standards promulgated to regulate this type of device.

The use of this invention allows very large areas with spans of greater than 25 feet to be covered with ease. Thus most window groupings, even several stories of a building, could be readily protected. This invention is light in weight, easy to use, does not require reinforcing bars, can be constructed in varying degrees of transparency, can be weather tight, is economical, and is capable of dissipating far greater forces without damage than stiff devices. Missiles striking this barrier make very little sound. Additionally, this invention is suitable to be configured with the necessary motor and supportive devices for automatic deployment.

This invention does not have rigidity but rather is very flexible, which gives several positive features including allowing for ease of storage as by rolling or folding. The flexible barrier of the invention is placed a distance out from the surface to be protected. An impacting missile stretches the barrier until it decelerates to a stop or is deflected. The barrier material has a predetermined tensile strength and stretch that makes it suitable for this application. Said known strength and stretch, together with the speed, weight and size of the impacting missile, all of which are given in test requirements, permit design calculation to ascertain barrier deflection at impact. This deflection is a determinate of the minimum distance that this barrier is to be spaced out from the frangible area to be protected. Other determinates which may be included are additional deflection from wind pressure and from slack from an improper installation.

The barrier of this invention is mounted farther away from the surface to be protected than the prior art structures, thereby providing room for a longer deceleration of impacting flying debris (missiles). Thus greater energy from a missile can be safely dissipated than is possible with the prior art structures, and the energy which can be safely dissipated is calculable.

I have found that the distance which the barrier is spaced out from the frangible surface need not be great and is quite workable. Even though the distance is not great, said distance does allow a significantly increased distance and time of deceleration such that the barrier will stop far stronger impacts than with the heretofore known rigid devices. In simple terms, the missile is slowed to a stop by elasticity as the barrier stretches. The greater the impact, the greater the stretch. Thus the building is not subjected to an abrupt harsh blow as the impact on the shutter is transferred to the building. The energy transfer is much gentler and less destructive than with the rigid devices.

This device goes beyond merely hanging a curtain in front of a structure and hoping wind born missiles will be stopped. This invention provides a method of calculating the minimum spacing of said barrier from the frangible surface and provides understanding as to the strength and integrity of said barrier. This invention employs a screen-like fabric with interstices that permit the light to pass through and that is reasonably transparent. Of course, if interstices are utilized in the fabric makeup, the size of the interstices must consider the size of the missiles such that the missiles do not pass therethrough. If transparency is not desirable, the fabric can be made sufficiently dense to minimize or eliminate the interstices. To assure a long life, the material of the fabric preferably would be resistant to the ultra violet radiation, and to biological and chemical degradation such as are ordinarily found outdoors. This invention contemplates either coating the material or utilizing material with inherent resistance to withstand these elements. A synthetic material such as polypropylene has been found to be acceptable. An example of a coated material is vinyl coated polyester. Materials intended to be used outdoors in trampolines, for example, are likely candidates for use in this invention. Black colored polypropylene is most resistant to degradation from ultra violet radiation. Other colors and vinyl coated polyester are sufficiently resistant, particularly if the barrier is not intended to be stored in direct sunlight when not in use.

The preferred embodiment allows air passage through it, albeit at substantially reduced rate. An upwind pressure of 1" of mercury, which roughly translates into a 100 mph wind, forces air through at 250 cfm or approximately 3 mph. The amount of air passage depends on the interstice size. If a weather tight and transparent barrier is desired, the polypropylene material may be laminated with a flexible clear plastic skin.

It is of importance that the material affords sufficient impact protection to meet the regulatory agencies' requirements in order for this to be a viable alternative to other hurricane protective mechanisms. While stiff structures, such as panels of metal, are easily tested for impact requirement and have certain defined standards, fabrics on the other hand, are flexible and react differently from stiff structures. Hence the testing thereof is not as easily quantified as the stiffer materials. However, certain imperial relationships exist so that correlation can be made to compare the two mediums. Typically, the current impact test of certain locales requires a wood 2×4 stud be shot at the barrier exerting a total force of approximately 230 pounds, or 61.3 psi, over its frontal (impacting) surface. This impact and resultant force relate to the Mullen Burst test commonly used by manufacturers to measure the bursting strength of their fabrics. Thus the impact test heretofore used on rigid devices will work equally well on this flexible device.

The preferred embodiment of this invention would use a textile of the type typically used in trampolines which would burst at 675 psi or a total of 2,531.25 pounds over the same 3.75 square inch frontal surface of the nominal 2×4 test missile and would stretch 21% immediately prior to failure. The strength and stretch characteristics of the material are known. The strength of this fabric is more than eleven (11) times the 230 pounds of strength required to withstand the above-described 2×4 missile test as presently required by said regulatory agencies. Stronger fabrics are available. Others are available in various strengths, colors and patterns. The maximum deflection can readily be calculated and hence the distance that the fabric must be spaced from the surface being protected can be easily ascertained.

As one skilled in this art will appreciate, the reason for the utilization of stiff materials for protection against the high winds and missile-like objects propelled thereby is because heretofore known barriers are mounted close to the frangible object being protected. Unfortunately, if the protective material is mounted close to the protected surface, it must necessarily be stiff in order to stop the missile short of the protected frangible surface. In such a situation, impacting missiles are required to come to an abrupt stop. Such abrupt stop of the missile on impact with the surface of the protecting structure is less desirable because the rapid energy dissipation has the propensity to cause damage not only to the protective device, but to the structure being protected as well. An extended, controlled deceleration is not available if the barrier is mounted close to the frangible surface.

The use of flexible fabric distanced out from the frangible area as a protective barrier allows extended deceleration. When the strength and stretch properties of the fabric are known and allowed for, the extended deceleration becomes controlled. By mounting the protective barrier some distance from the frangible surface, a distance that is calculable, the missile can be decelerated to a stop prior to contacting the frangible surface. In other words, in any situation where the missile must stop prior to impacting the frangible surface being protected, it is desirable to decelerate the missile through an extended, controlled deceleration. This invention does precisely that.

An extended deceleration has much less propensity to cause damage than an abrupt deceleration. Since the use of a flexible material as a protective barrier affords an extended deceleration, very strong impacts can be withstood. It is contemplated that this invention, using the proper material and the proper assembly, will be sufficient to meet all foreseeable impact test requirements and regulations for wind and debris protection. Such requirements and regulation would include more severe tests being contemplated for specialized, high protection, shelters.

Thus, an object of this invention is to provide a barrier made from fabric to protect the frangible portions of a building and the like from the force of wind and impact from wind-borne debris. A feature of this invention is spacing the barrier out from and in front of the frangible area to be protected by attaching two opposing edges to anchors located so as to position the barrier as described. Another feature is the formula for calculating minimum spacing.

For example, one edge of the fabric can be anchored to the overhang of the roof or other high structure and the opposite edge of the span to the ground or low structure to provide a barrier spaced from and in front of the object to be protected. The lower anchors can be attached to the ground by imbedding in cement or other ground attachment such as tie downs or stakes and the like and providing grommets, rings or other attachments in the fabric to accept a clamp, cable, rope, and the like. The barrier is sufficiently spaced from the structure being protected in order to absorb and dissipate the energy from impact prior to the impacting object reaching the structure. The deceleration of the impacting object is extended in comparison to a stiff barrier.

The curtain-like barrier of this invention is characterized as a reasonably transparent barrier with strength and simplicity that is unattainable with the heretofore known barriers. Impact by a missile does not cause a large bang, and is not disturbing. It is easy to install, requires low maintenance and has low acquisition cost. There is much flexibility with storage. It can either be left in place or rolled much as a shade, or slid out of the way much as a curtain, so as not to obstruct the translucent of the window or interfere with the aesthetics of the building. It can also be fully removed and stored out of the way, or swung up to form a canopy when not in use as a protective barrier. It is preferable but not essential, that the material selected to be used in the netting fabric of this invention be inherently resistant to elements encountered in the outdoors or can be coated with coatings that afford resistance to these elements.

Another feature of this invention is that it is capable of providing the dual function of protection against flying missiles as well as providing anchoring capabilities, such as tying down the roof of the building or structure being protected to prevent it from being lifted off.

Another feature of this invention is that it can be reasonably transparent if desired without adversely affecting the integrity of the barrier.

Another feature of this invention is that missile impact is reasonably quiet and not a loud, frightening bang as with heretofore known rigid devices.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

This invention uses flexible material that has known qualities of strength and stretch and is sufficiently strong to withstand applicable impact testing. The invention does not derive its strength from stiffness or rigidity but rather from its bursting strength and stretch, with the latter acting like a spring to gradually decelerate any impacting missile. To be able to calculate the minimum distance that the barrier must be placed out from the area to be protected, the frontal area, weight and speed of the test missile must also be known. Wind speed may become a significant factor in large spans. The generic barrier needs only these requirements.

There are many desirable characteristics of this invention such as transparency, resistance to weathering, lightweight, ease of installation, deployment and storage, economy. Additionally, there are several methods of deploying and storing this barrier.

Figure 1:
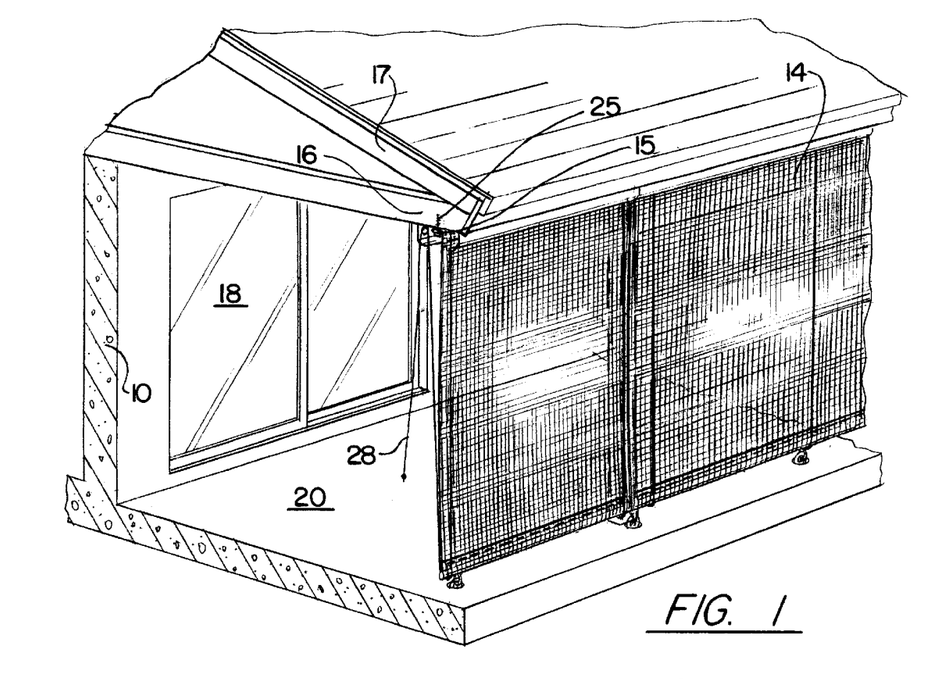
FIG. 1. is a partial view in perspective and schematic illustrating this invention in the deployed position and attached to the eave of a building.
Figure 2:
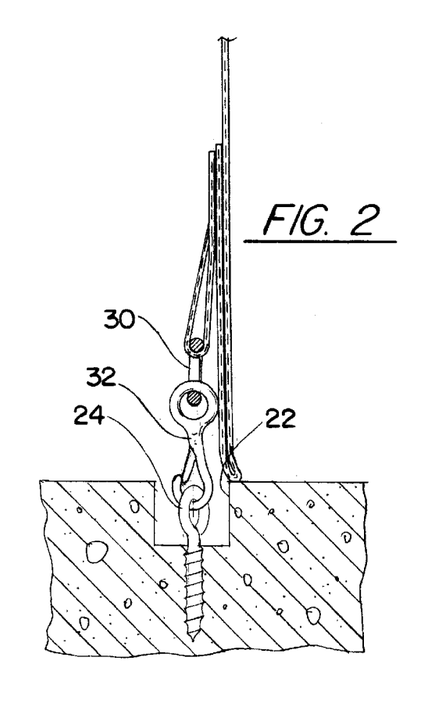
FIG. 2 is a partial view in section illustrating mechanism for tying down the protective barrier.

While this invention is shown in its preferred embodiment as being utilized to protect the windows and overhang roof of a structure, it is to be understood that this item has utility for other items requiring protection and is applicable to other types of structures. Where appropriate, the barrier can be deployed horizontally or at any angle as well as the vertical as shown in FIG. 1.

Figure 3:
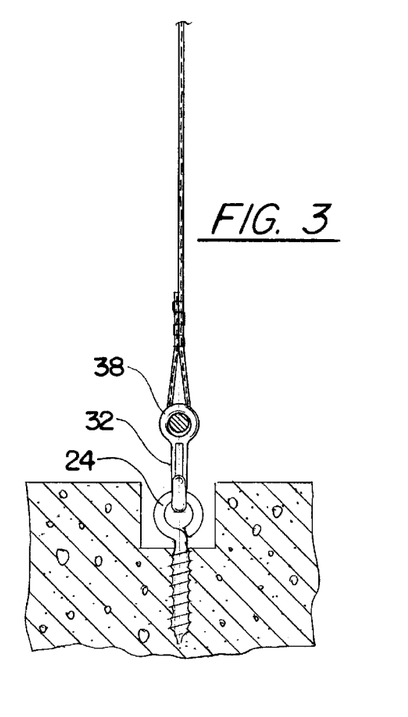
FIG. 3 is a partial view in section illustrating another tie-down mechanism as shown in FIG. 4.
Figure 4:
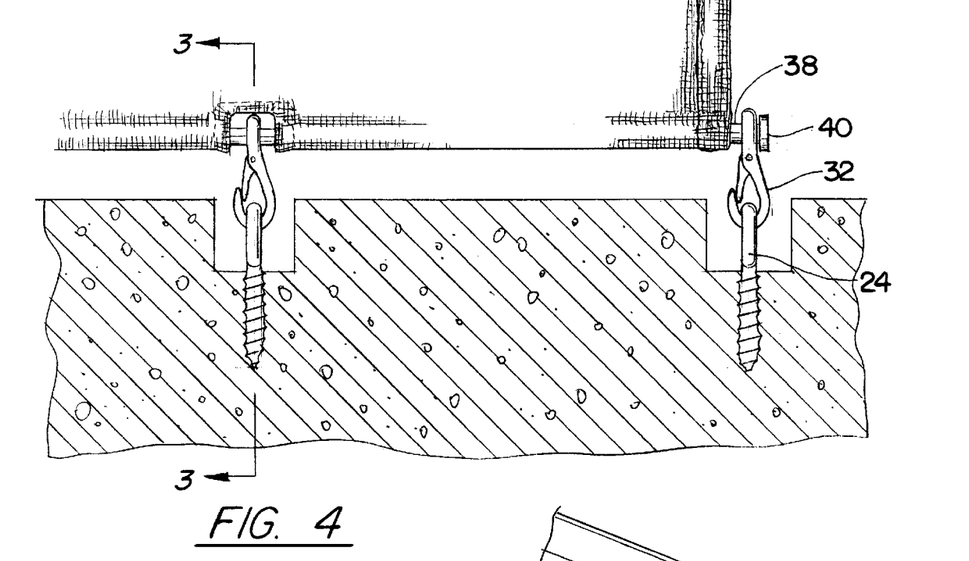
FIG. 4 is a detailed showing of alternative mechanism for attaching the tie-down mechanism to the barrier.
Figure 5:
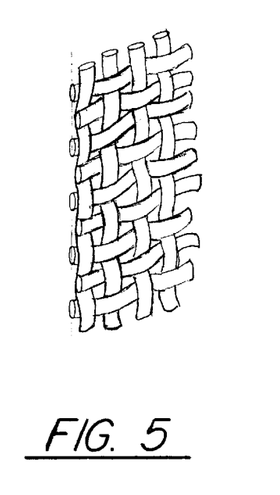
FIG. 5 is a partial view illustrating a sample plain weave pattern of fabric used in the barrier.

Reference is now made to FIGS. 1–6 which partially show a building structure 10 including a cement patio 20 and windowed sliding doors 18 intended to be protected from the onslaught of winds and debris typically occasioned during a hurricane. In this particular disclosure the building includes an overhang roof and a cement patio. According to this invention the top of a curtain panel or barrier 14, made from a textile woven of a suitable fiber, (other weaves or knits may be used) is attached to roof 16 and the bottom thereof is attached to the patio 20. A suitable material is polypropylene formed in a monofilament and woven into a geotextile (style 20458) manufactured by Synthetic Industries of Gainesville, Ga. The fabric is woven in a basket (plain) weave as shown in FIG. 5 where the fill 11 and warp 13 threads alternately cross over and under adjacent fills and warps. In the preferred embodiment the interstices are substantially equal to 0.6 millimeters which approximates the interstices of commercially available residential window screening.

The selection of interstice size and configuration is dependent on the amount of transparency and air passage desired and the limitation that the maximum size must be sufficiently small to prevent objects that are potentially damaging on impact from passing therethrough. The above-mentioned regulations, set in place by Miami-Dade County, Fla., have determined that the smallest diameter missile (wind blown debris) with which they are concerned is $3/16$ inch in diameter. Therefore to satisfy the Dade County Regulations the interstices must be small enough to prevent $3/16$ inch diameter missiles from passing therethrough. Other regulations may set other minimum missile diameter sizes, and the interstice size would vary accordingly if new standards were to be met.

The endurance, physical, hydraulic and mechanical properties of the textile are recorded and available from the manufacturer, Synthetic Industries. It is important to this invention that whatever type of material is utilized, the fabric made up from this material must exhibit sufficient impact strength for resisting the test impact loads at least to the values dictated by the various industrial, insurance and government regulating agencies. This particular fabric has been shown to be able to withstand forces at over 11 times the test load required by the regulating agency presently in the forefront of standard setting. In one embodiment, the material used is approximately 5% open.

The material selected must meet certain strength criteria. These criteria, together with the size of span covered by the barrier, constitute the basis for calculating the spacing of the barrier from the object being protected. Said spacing is calculated as follows:

1) The fabric must be sufficiently strong that the impact force it is required to withstand is less than the failure force (Mullen Burst).
2) The impact (test) force is then divided by the force required to cause failure (Mullen Burst). This quotient is then multiplied by the known stretch at failure to obtain the stretch factor. The woven polypropylene synthetic fabrics of the type used in the preferred embodiment stretch 20–22% just prior to failure, depending on manufacturing technique. This stretch information is available from the manufacturer.
3) The actual stretch measurement is then calculated and in conjunction with the span of the barrier used to ascertain the maximum deflection. This maximum deflection is the minimum distance the barrier should be spaced from the frangible object being protected.

EXAMPLE

The preferred embodiment is used as an example to demonstrate this formula. The preferred embodiment is a polypropylene, woven monofilament geotextile. The individual filaments are woven into a basket weave network and calendered so that the filaments retain dimensional stability relative to each other. This geotextile is resistant to ultra violet degradation and to biological and chemical environments normally found in soils. This fabric is often used as the mat for outdoor trampolines and is intended to be very resistant to weathering. The fabric is known to stretch a maximum of 21% prior to failure and requires a force of 675 psi to fail.

1. The present test that was originally legislated by Dade County Fla. and may become the standard in the industry, requires the barrier to withstand a force of only 61.3 psi. Consequently the fabric meets and exceeds the first requirement of strength.
    1. The stretch factor calculation is (test load/maximum load×% stretch at maximum load=stretch factor) 61.3/675×21=1.9%. This becomes a constant factor insofar as this fabric and the Dade test remain involved. The calculation will change if any one or more of the strength, energy or stretch characteristics of the test or fabric are modified. Likewise, it is known that stretch varies directly with force up to the maximum at failure. To calculate the actual stretch, the calculation is stretch factor×height=actual stretch. Therefore if the distance between the two fastened sides is eight feet (96 inches), the stretch measurement will be 96×1.9%=1.83".
    2. To calculate the deflection, right triangles are used such that the hypothenuse is ½ of the sum of the height plus stretch (97.83/2=48.92"). The known side is ½ of the height (96/2=48"). Thus the deflection=the square root of the difference between the square of the hypothenuse less the square of the known side. This result is 9.4" which is the maximum deflection on impact by test missile.
    3. Thus to meet the prescribed standard the barrier must be mounted so as to be spaced at least 9.4 inches from the surface to be protected if an eight (8) foot span is to be used. A longer span will require wider spacing, a shorter will require less. The table shown below reflects this spacing for various sample distances of span with this preferred fabric.

Table demonstrating relationship between

Span and Maximum Deflection in the Preferred Embodiment as Described Above.

| Height | Deflection |
| --- | --- |
| 8 feet | 9.4 inches |
| 10 feet | 11.8 inches |
| 12 feet | 14.1 inches |
| 14 feet | 16.5 inches |
| 16 feet | 18.8 inches |
| 18 feet | 21.2 inches |
| 20 feet | 23.5 inches |
| 22 feet | 25.9 inches |
| 24 feet | 28.2 inches |
| 30 feet | 35.2 inches |
| 40 feet | 47.0 inches |

The aforementioned formula is sufficient to provide spacing to meet the test standards. As the spacing is intended to be minimum, and although the barrier is intended to meet or exceed test standards as opposed to warranting protection in actual situations which are difficult to predict, this invention can include an additional factor in the spacing to allow for maximum wind pressure. Arbitrarily assuming a 115 mph wind at 90 degrees to the barrier and assuming the barrier has been made weather tight with no air flow through the barrier to somewhat relieve pressure, and assuming the barrier is installed at sea level where air is densest, the additional pressure on the barrier will be 0.237 pounds per linear inch of span. This additional pressure can be resolved into a vector and added directly to the test force of 61.3 pounds. Thus an 8 foot barrier will have an additional (0.237×96=) 22.75 pounds added for a total of 84.05 pounds. A 40 foot barrier will have (0.237×480=) 113.76 pounds added for a total of 175.06 pounds. This number should be substituted into the above formula to give a more accurate calculation of minimum spacing.

For example: an 8 foot barrier could deflect 10.9" when allowing for a 115 mph wind factor rather than 9.7" if the wind was not factored in. The deflection of a 40 foot barrier becomes 80.28" (6.69') rather than 47" (3.9').

Figure 6:
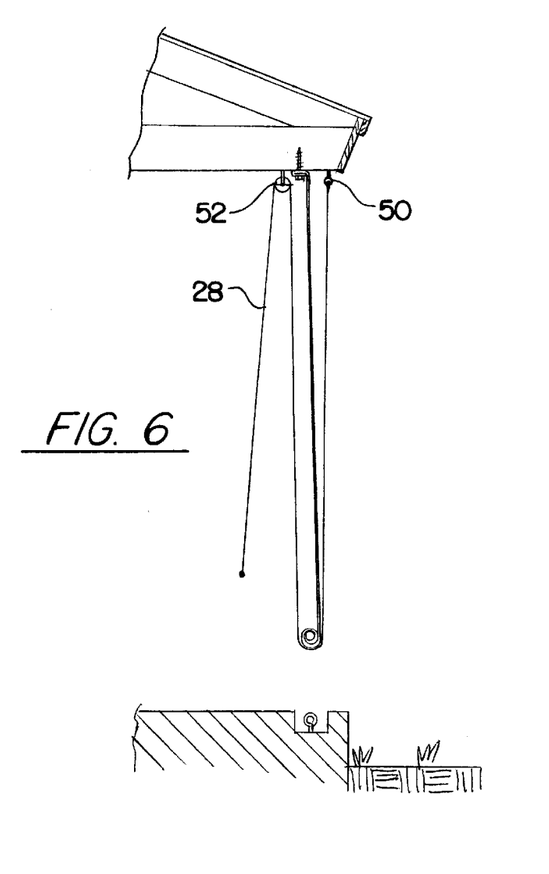
FIG. 6 is a diagrammatic and schematic view illustrating the barrier as shown in FIG. 1 partially rolled up.
Figure 7:
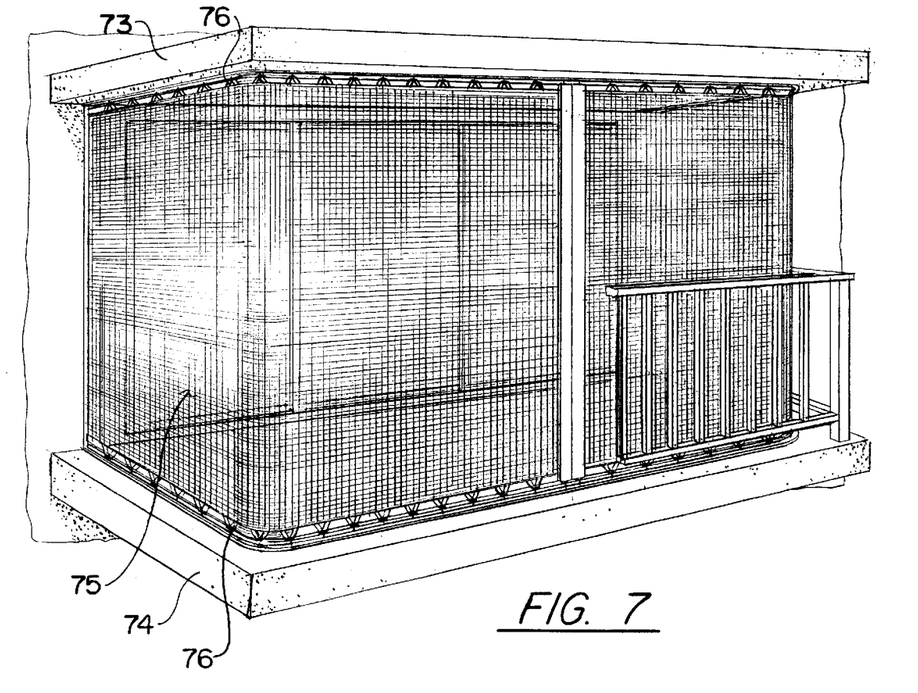
FIG. 7 is a view in perspective illustrating the invention being utilized to encapsulate a deck or porch particularly such as are found in high rise buildings.
Figure 8:
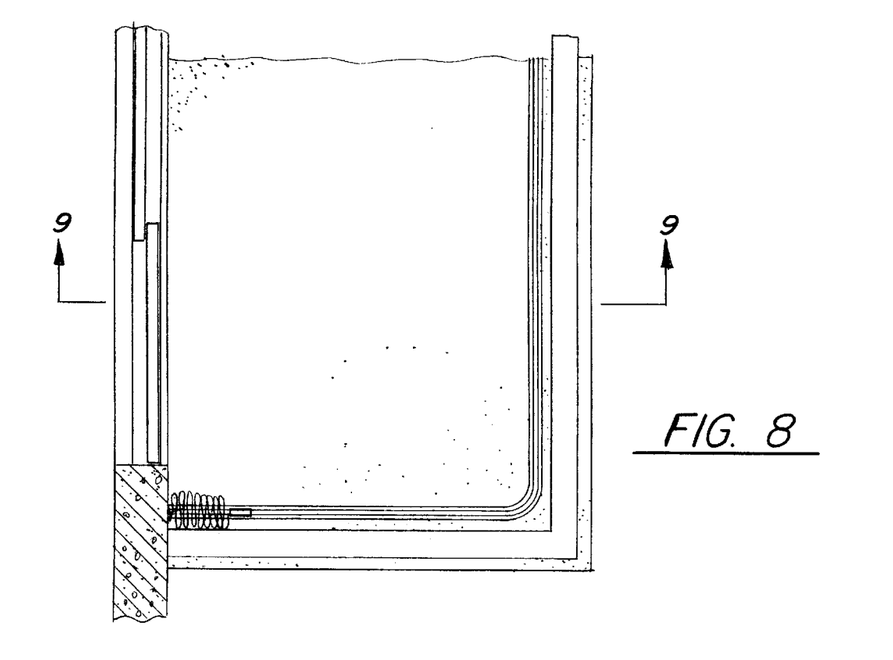
FIG. 8 is a fragmented top plan view of the embodiment depicted in FIG. 7 with the barrier retracted for storage.
Figures 9, 10:
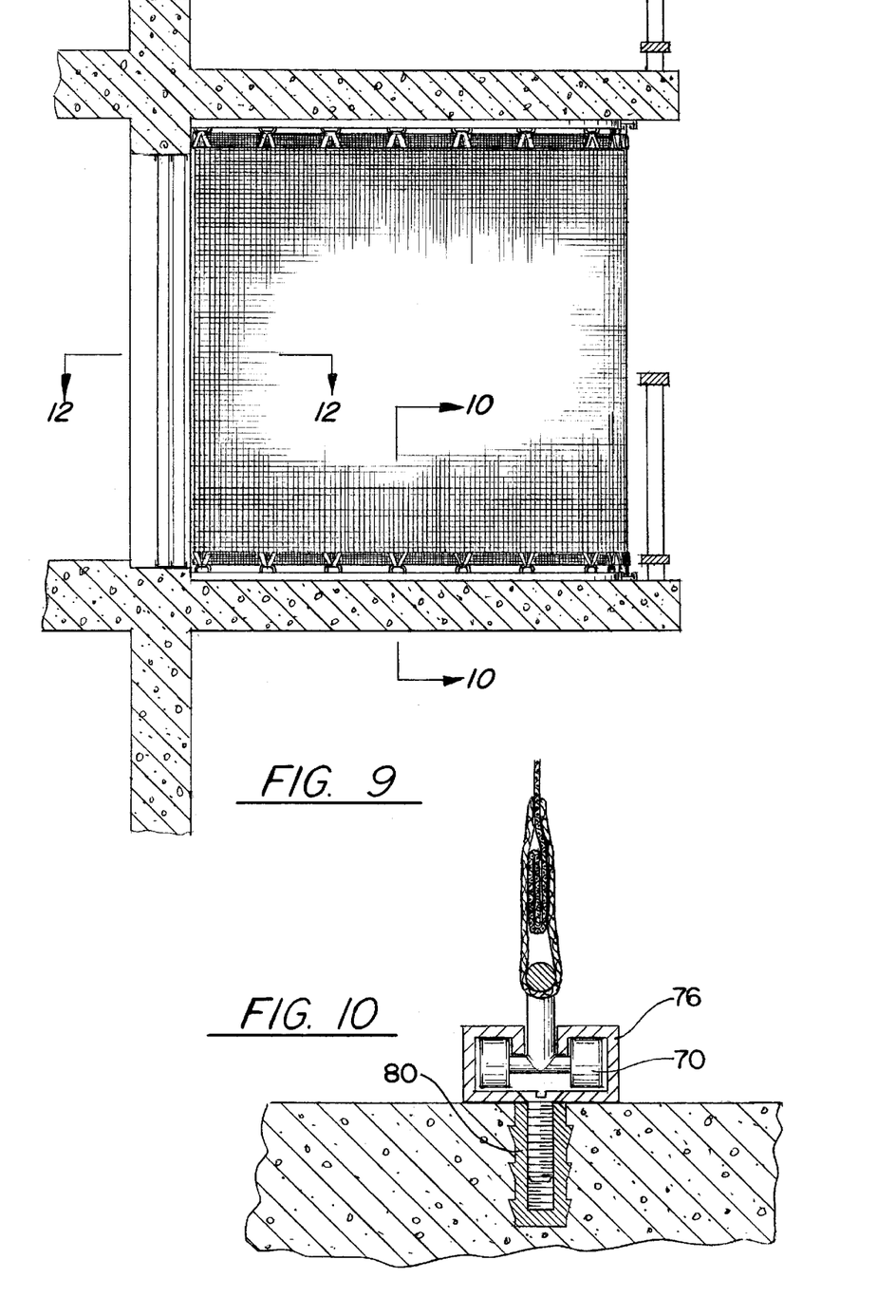
FIG. 9 is a view in elevation and section taken along lines 9—9 of FIG. 8 but with the barrier deployed.
FIG. 10 is a view in section taken along the lines 10—10 of FIG. 9 showing end view of roller/track mechanism.
Figure 11:
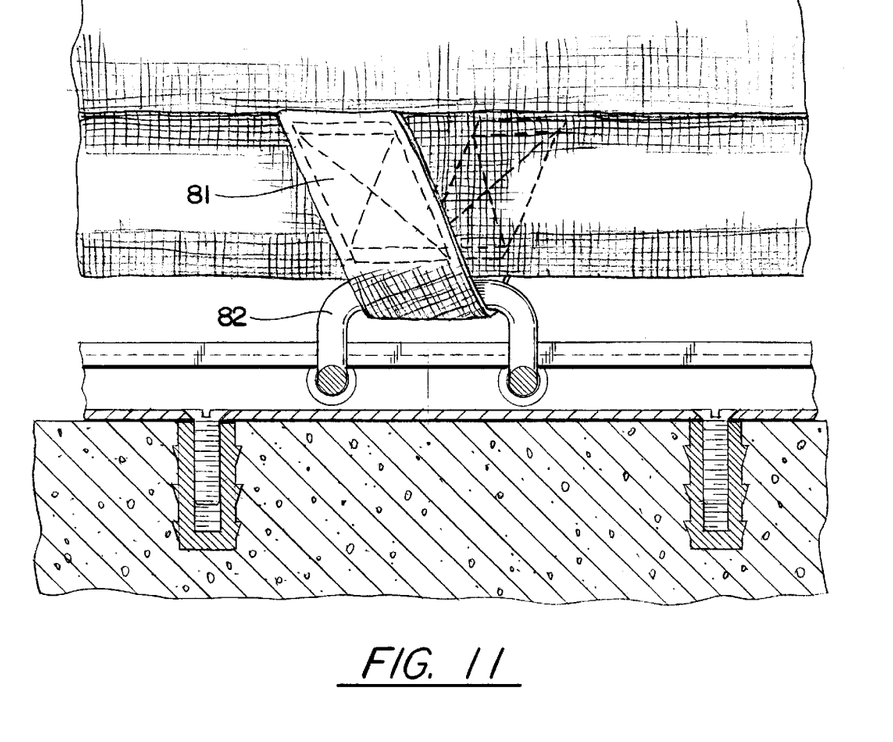
FIG. 11 is an enlarged side view illustrating the details of the roller/tie down mechanism in FIG. 10.

Once the minimum space between the barrier and the structure being protected is established, the fabric must be anchored in a suitable manner so as to absorb the loads without being torn from its support. As shown in FIG. 1 the protective barrier may be attached to a batten 15 that is attached to the eaves 16 of the roof 17 by suitable threaded bolts or screws 25 or the like. The batten attaching method allows for ease of installation as the installer can wrap the material around the batten as necessary to adjust the material to the span and then attach the batten to the building. Additionally, the use of a batten allows the edge of the barrier to be securely fastened overhead in a simple and economical method. Other methods are available in appropriate situations. The lower edge is fastened by anchors set in recesses 22 formed into the cement to bury or partially bury eyebolts 24. The eyebolts 24 are permanently screwed into the remaining portion of the cement. This invention contemplates other methods of anchoring the top and bottom of the curtain panels depending on the particular application. The sides of the panels, where appropriate, can likewise be anchored. The panels may also be fabricated with a selvage or hem or can utilize a reinforcing tape such as "Polytape" that is made from a polypropylene material. The selvage or tape may include commercially available grommets or rings to accept the tie-down hardware. The attachment ring 30 carries a self-locking clamp 32 adapted to fit the eyebolt 24 to tie down the curtain. In FIG. 3 clamp 32 captures a rod 38 and clamps to the eyebolt 24. In the embodiment shown in FIGS. 3 and 4, the clamp 32 is fitted to a sturdy rod 38 running the length of the bottom edge of the barrier that is secured in the hem formed by folding the material of the curtain as shown. In FIG. 4 the end cap 40 can serve as a glide in a track if end tracks (not shown) are desired for raising and lowering the barrier. An automatic deployment system could require such end tracks. The same reference numerals depict like parts in all the Figs. Commercially available grommets or attached rings 30 may be utilized to hold the clamp 32. In this manner the curtain is anchored via the clamp 32 and eyebolt 24. Rod 38 may include an end cap 40 mounted on the end thereof to prevent the rod from falling out of the loop of the curtain. One method of rolling up the curtain in order to move it out of the way when not in use is shown in FIG. 6. As shown in FIGS. 1 and 6 the curtain carries a pull cord 28 that is looped around the end of the barrier. As noted in FIGS. 1 and 6, the cord 28 is attached to the eave of the roof by a standard eye bolt 50 and is wrapped around the end of the curtain and passed through a suitable pulley 52, also attached to the eave. Multiple apparatuses of this nature would be needed for a long run of barrier. All would be controlled from one position much like similar existing blind roll up mechanisms. The free end freely hangs and allows the operator to pull or release it to roll up or let down the curtain as required. Ideally the deployed curtain should only be sufficiently taut to remove slack. If during the installation slack is left this should be allowed for in calculating the said minimum spacing.

Figure 12:
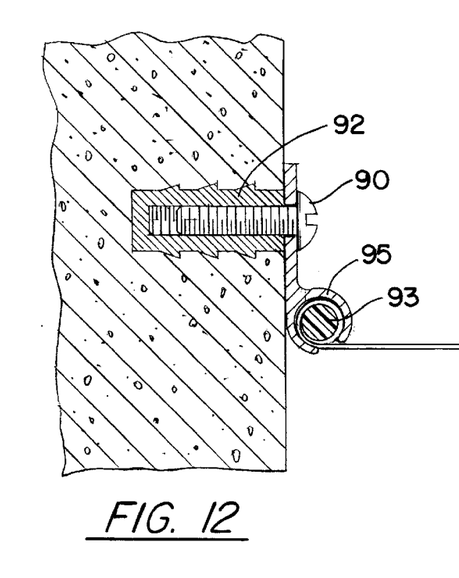
FIG. 12 is a partial view in section taken along lines 12—12 of FIG. 9 utilizing a channel mechanism to attach a side of the curtain to a wall.
Figure 13:
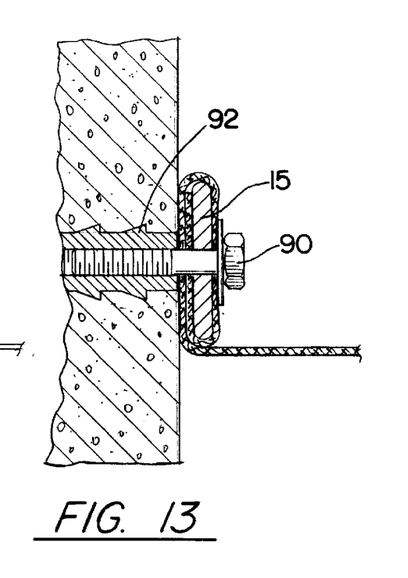
FIG. 13 is the same view as FIG. 12 utilizing a batten attaching mechanism.

FIGS. 7–14 exemplify another embodiment where the invention may be used to enclose a porch or deck where there is a floor 74 and parallel ceiling 73. In this embodiment the curtain 75 rides on rails 76 of any sturdy well-known commercially available type. An example of a rail and glider is disclosed in FIG. 10 where the glider 70 fits into a top and bottom rail or track 76 which is suitably attached to the ceiling 73 and cement floor 74. The attachment may be by insert and bolt 80, as shown. A similar attachment for rail and glider is utilized on the ceiling. The top and bottom of the curtain panels are attached to the glider by a suitable tape 81 that is fitted through the eyelet 82 and looped to form a loop which is sewn into the curtain panels in a well known manner and in a butterfly pattern. The edges at the top and bottom of each panel of the curtain are folded over one or two times to assure the structural integrity of the panels. The side edges of the curtains may be suitably attached to the siding of the building as by FIG. 13 in which the material is wrapped around a batten 15 which is in turn fastened to the wall with appropriate screws 90. In this instance the screw 90 fits into inserts 92 as would be done in cement. An alternate fastening is shown in FIG. 12. A rope 93 is fitted into a hem formed at the end of the barrier and fits into a partial circular channel 95 formed on the end of the frame that is anchored to the wall of the building and secures the barrier into the channel.

Figure 14:
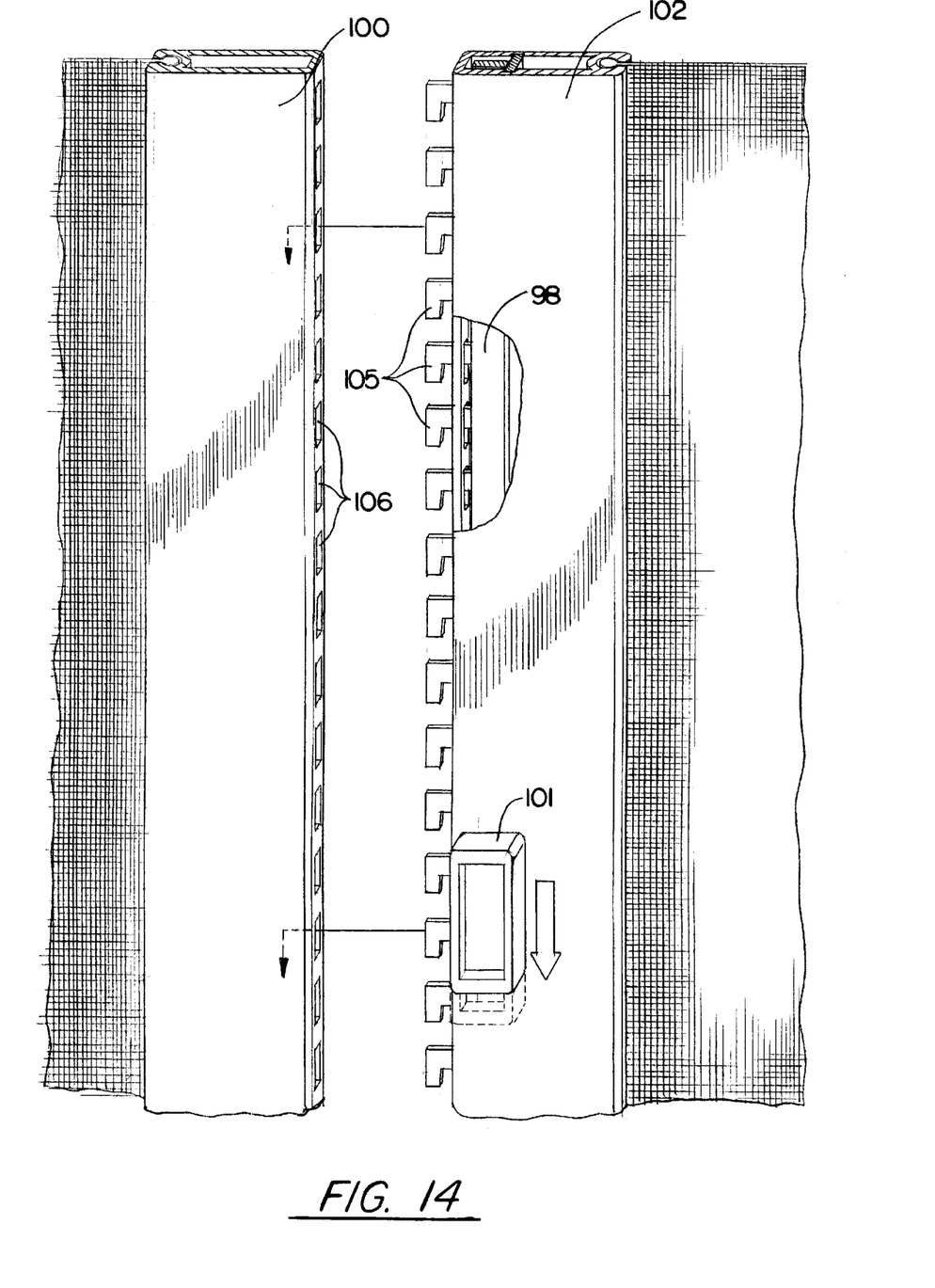
FIG. 14 is an enlarged view illustrating mechanism for attaching the ends of the barrier to permit the barrier to be opened and stored.
Figure 18:
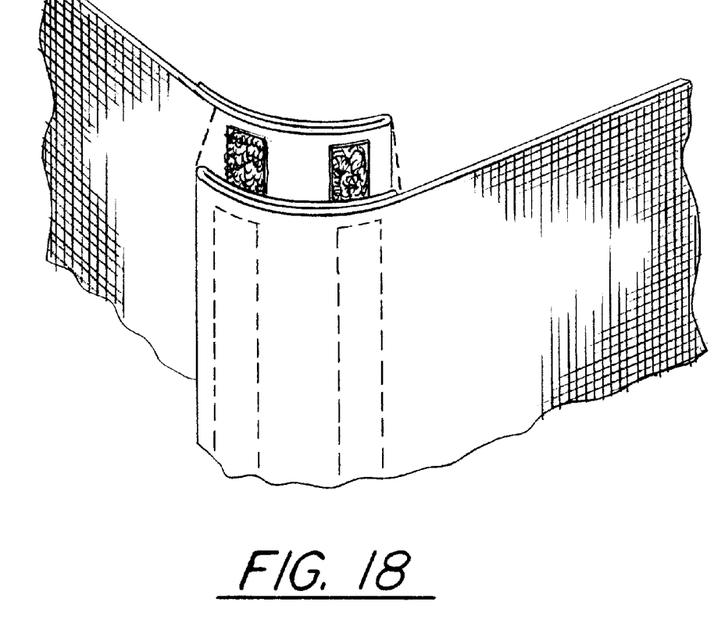
FIG. 18 is an enlargement example of a fastening system using hook and loop method to attach adjacent sections of barrier one to the other, particularly when they meet at an angle to each other.
Figure 19:
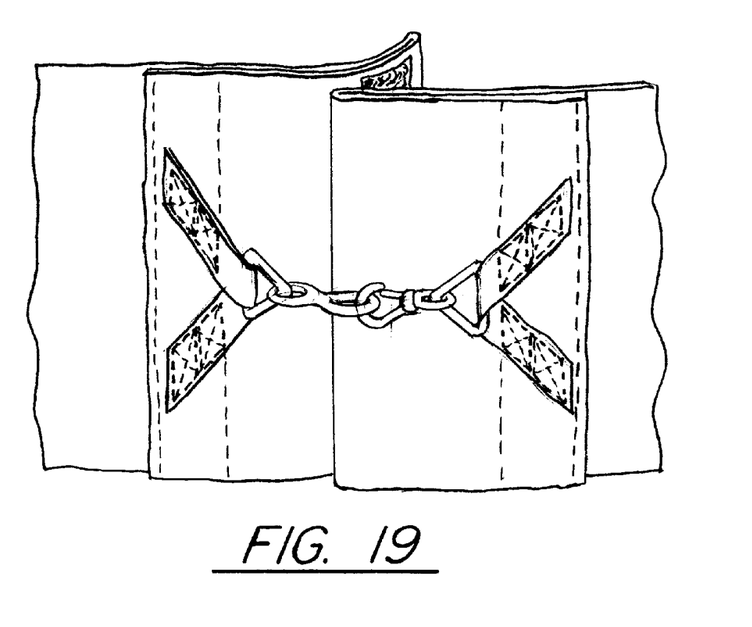
FIG. 19 is an enlargement example of a hook and eye method of attaching adjacent sections of barrier.

The abutting ends of the curtains are fitted into an elongated closure panel with a female fitting 100 and male fitting 102 as shown per FIG. 14 for closing the curtains in a similar manner as is done with the sliding doors. The latches 104 on the male fitting fit into the female slots 106 and an arm 98 attached to handle 101 is supported to move rectilinearly for securing the panels in a locked position. Alternative end fastenings are shown in FIGS. 18 and 19 wherein the ends are overlapped and secured one to the other using hook and loop tape (FIG. 18) or spaced hook and eye attachments (FIG. 19).

Figure 15A:
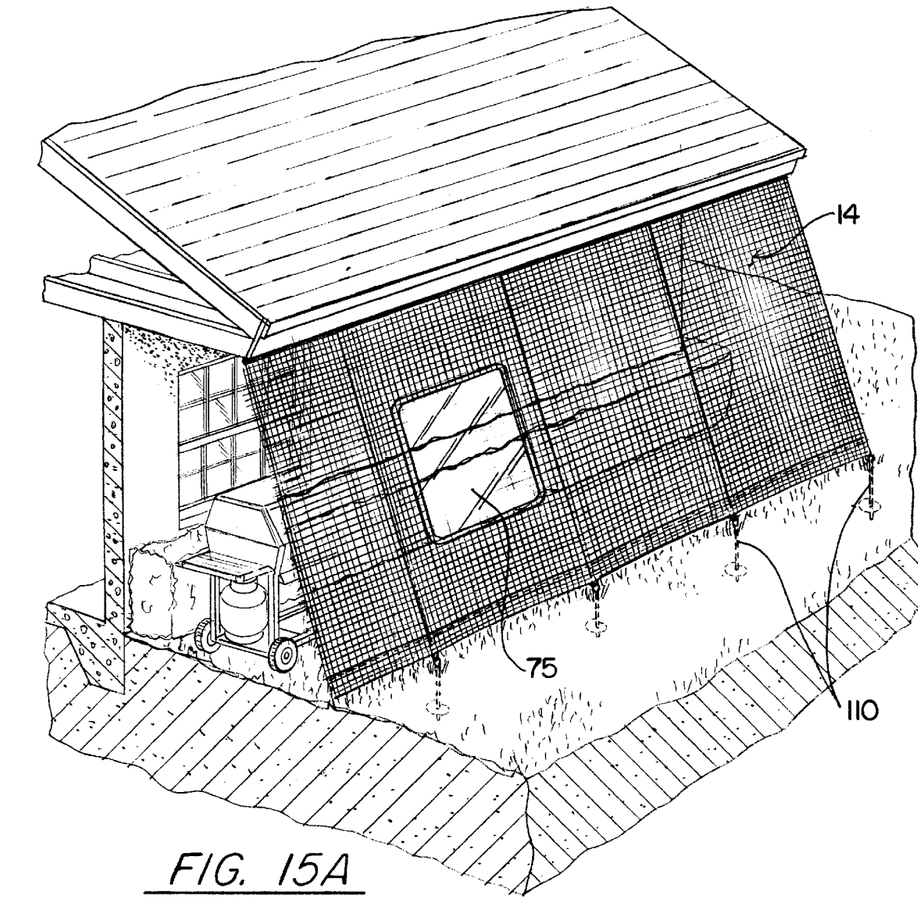
FIG. 15A is a partial view in perspective and schematic exemplifying another embodiment of this invention, including a section of clear vinyl laminated to the screen, providing a weather-tight barrier.
Figure 15B:
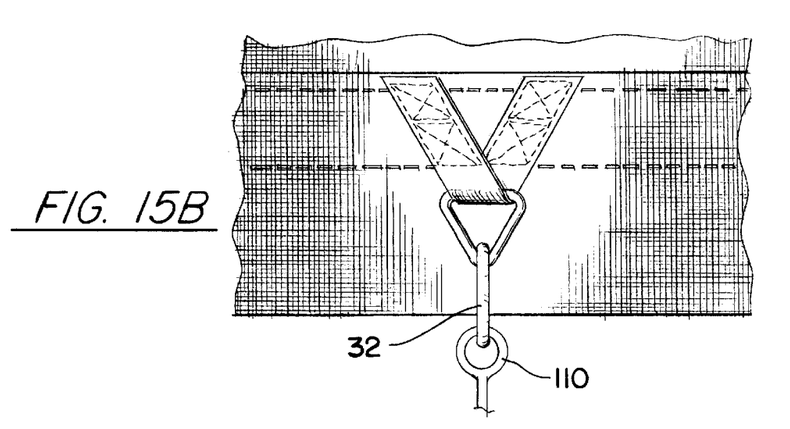
FIG. 15B is a side view of the FIG. 2 enlargement of the ring attachment to the ground as in FIG. 15A, including an extended apron of fabric.
Figure 15C:
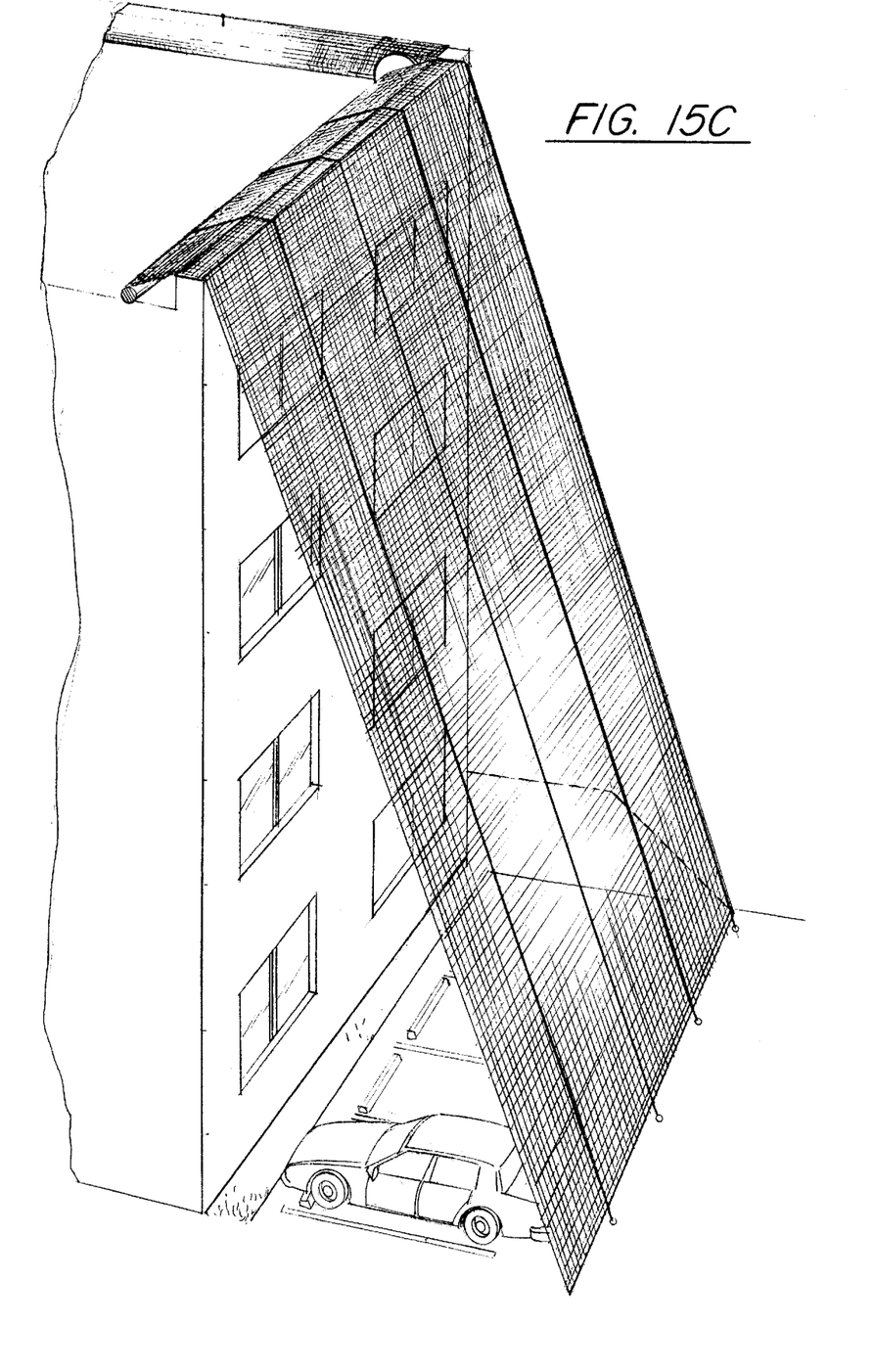
FIG. 15C is a partial view in perspective of the embodiment shown in FIG. 15A but spanning several stories of a building rather than one story as in 15A.
Figure 16:
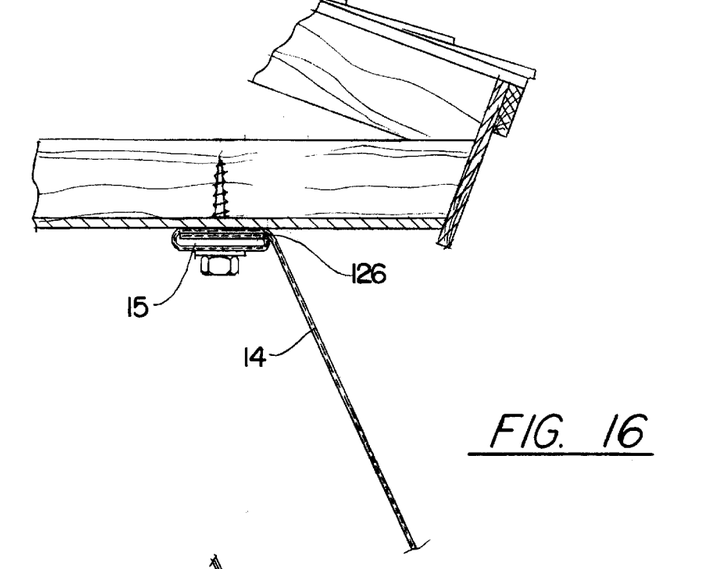
FIG. 16 is an enlargement of the upper attachment in FIG. 15A.
Figure 17:
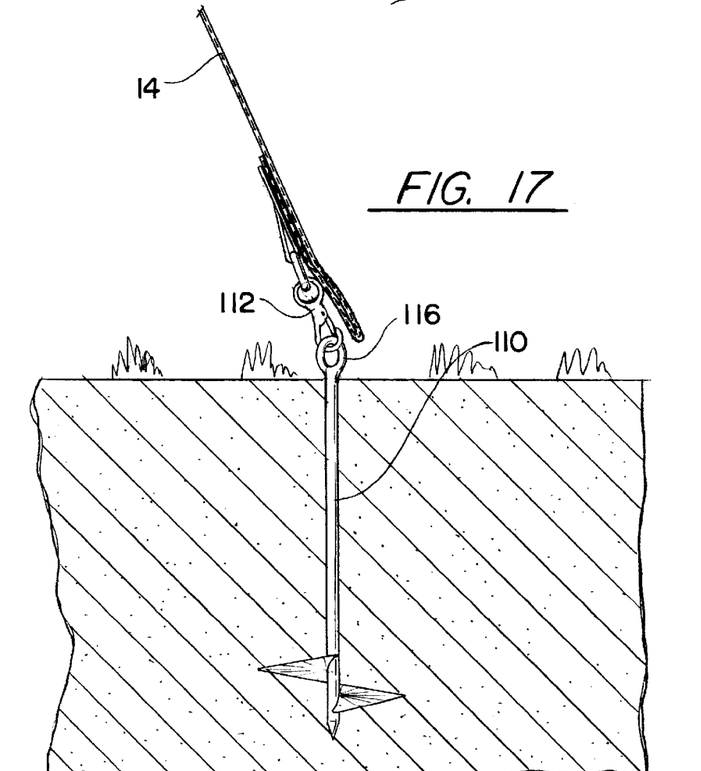
FIG. 17 is a schematic view of FIG. 15B and including a type of ground anchor.

FIGS. 15A, 15B, 15C, 16 and 17 exemplify another embodiment of this invention wherein the curtain 14 may be mounted on a slant. The bottom of the curtain 14 may be anchored into the ground as shown by the stakes 110. The ground anchor stakes 110 shown are of a commonly available type often used to anchor sheds or telephone poles. As seen in FIG. 17 a suitable clamp 112 tied to barrier 14 is clamped onto the eyelet 116 of stake 110. FIG. 16 discloses another mechanism for tying the barrier 14 to the roof of the building. In this embodiment the fabric is wrapped around the sturdy batten 15 that is lag bolted or screwed to joists or other sturdy feature. This is essentially the same mechanism that is shown in FIG. 12, but is overhead rather than on a wall. Tape 126 may be sewn or glued to the top edge of the barrier 14 for greater strength where it wraps the batten. This would provide reinforcement in the event of a span covering several stories.

FIG. 15C shows an embodiment of this invention in which the barrier is deployed on a slant and is covering several stories of a building. Deployed in this manner the barrier serves to provide protection from wind blown missiles for the frangible parts of the building and additionally for automobiles parked thereunder. FIG. 15C could accept the barrier rolled and stored on the roof of the building as a very convenient installation. The method of deploying and storage could be as in FIG. 1. The barrier need not be spaced out from the building if the frangible portions, such as windows are inset sufficiently as is often the situation.

What is shown by this invention is a simple, adaptable, transparent, economical, and aesthetically pleasing device that is suitable to protect the building, doors and windows from the forces of winds occasioned by hurricanes and the debris carried by the winds. The textile barrier can either be removed and stored in a very simple manner without requiring a lot of space or could remain installed and either rolled, swung or slid out of the way.

Although this invention has been shown and described with respect to detailed embodiments thereof, it will be appreciated and understood by those skilled in the art that various changes in form and detail thereof may be made without departing from the spirit and scope of the claimed invention.

What is claimed is:

1. A flexible protective barrier device for protecting a frangible portion of a structure from the force of wind and objects carried thereby, said device comprising:

a flexible screen having a predetermined strength and being characterized by interstices, said interstices being constructed and arranged so that said screen substantially reduces the velocity of wind passing through said interstices;

a first anchoring means for attaching said screen to an overhanging boundary of said frangible portion, said overhanging boundary extending from said structure;

a second anchoring means for attaching said screen to an underlying boundary of said frangible portion, said second anchoring means cooperating with said first anchoring means to selectively maintain said screen in a use orientation;

whereby when said screen is in said use orientation, said first and second anchoring means maintain said screen in a spaced apart relationship with said frangible portion, thereby allowing for deceleration of objects impacting said screen;

said first anchoring means includes a rigid strip for extending laterally along a mounting surface of said overhanging boundary, said strip being positioned to maintain a first mounting edge of said screen against said mounting surface;

at least one fastening member constructed and arranged to secure said strip to said overhanging boundary;

said second anchoring means includes at least one fastening member adapted to link said second mounting edge of said screen with said underlying boundary when said screen is in said use orientation;

a support means for adjustably positioning said screen second mounting edge with respect to said underlying boundary, said support means includes at least one pulley for mounting on said overhanging boundary;

and at least one corresponding flexible member operatively associated with said pulley, said flexible member having a first end for attachment to said overhanging boundary and a free second end, said first and second ends being spaced apart by a middle portion, said middle portion adjustably supporting said pole, whereby when said second end is pulled with respect to said pulley, said middle portion travels about said pulley, thereby producing vertical motion of said pole and said screen second mounting edge.

2. The flexible protective barrier device of claim 1, wherein the velocity of said wind at a leeward side of said screen is approximately 2.5% to 3.5% of the velocity of said wind at a windward side of said screen;

whereby the velocity of wind passing through said screen is reduced by approximately 97%.

3. The flexible protective barrier device of claim 2, wherein each of said interstices have a surface area small enough to stop a missile having a diameter of 3/16 inch.

4. The flexible protective barrier device of claim 1, wherein:

said first anchoring means includes a first track for being disposed along said overhanging boundary; and at least one connector member attached to a first mounting edge of said screen, said at least one connector being constructed and arranged to slidably engage said first track; and said second anchoring means includes a second track for being disposed along said underlying boundary; and at least one connector member attached to a second mounting edge of said screen, said at least one connector being constructed and arranged to slidably engage said second track.

5. The flexible protective barrier device of claim 4, wherein:

said flexible screen includes a first half being characterized by a first connector disposed along a first linking edge, said first connector having at least one linking aperture; and a second half being characterized by a second connector disposed along a second linking edge, said second connector having at least one linking member adapted to selectively engage said at least one linking aperture;

whereby when said at least one linking member engages said at least one linking aperture, said screen halves cooperatively form a substantially contiguous expanse of material.

6. The flexible protective barrier device of claim 1, wherein:

said second anchoring means includes a rigid pole disposed along a second mounting edge of said screen; at least one fastening member adapted to link said pole with said underlying boundary when said screen is in said in use orientation.

7. The flexible protective barrier device of claim 6, wherein said at least one fastening member is a soil engaging-engaging anchor.

8. A flexible protective barrier device for protecting a frangible portion of a structure from the force of wind and objects carried thereby, said device comprising:

a flexible screen having a predetermined strength;

a first anchoring means for attaching said screen to an overhanging boundary of said frangible portion, said overhanging boundary extending from said structure;

a second anchoring means for attaching said screen to an underlying boundary of said frangible portion, said second anchoring means cooperating with said first anchoring means to selectively maintain said screen in a use orientation;

whereby when said screen is in said use orientation, said first and second anchoring means maintain said screen in a spaced apart relationship with said frangible portion, thereby allowing for deceleration of objects impacting said screen;

said first anchoring means includes a rigid strip for extending laterally along a mounting surface of said overhanging boundary, said strip being positioned to maintain a first mounting edge of said screen against said mounting surface;

at least one fastening member constructed and arranged to secure said strip to said overhanging boundary;

said second anchoring means includes at least one fastening member adapted to link said second mounting edge of said screen with said underlying boundary when said screen is in said use orientation;

a support means for adjustably positioning said screen second mounting edge with respect to said underlying boundary, said support means includes at least one pulley for mounting on said overhanging boundary;

and at least one corresponding flexible member operatively associated with said pulley, said flexible member having a first end for attachment to said overhanging boundary and a free second end, said first and second ends being spaced apart by a middle portion, said middle portion adjustably supporting said pole, whereby when said second end is pulled with respect to said pulley, said middle portion travels about said pulley, thereby producing vertical motion of said pole and said screen second mounting edge.

* * * * *